United States Patent [19]
McDermott

[11] Patent Number: 5,383,280
[45] Date of Patent: Jan. 24, 1995

[54] DIRECTION INDICATOR FOR NAVIGATION

[76] Inventor: Kevin McDermott, 196 Phillips Dr., Hampstead, Md. 21074

[21] Appl. No.: 979,786

[22] Filed: Nov. 20, 1992

[51] Int. Cl.$^6$ ............................................. G01C 17/02
[52] U.S. Cl. ........................................ 33/361; 33/349; 33/355 R
[58] Field of Search ................... 33/355 R, 349, 361, 33/358, 359

[56] References Cited

U.S. PATENT DOCUMENTS

| | | | |
|---|---|---|---|
| 3,237,584 | 3/1966 | Keithley, Jr. | |
| 4,104,803 | 8/1978 | Hoeppel | 33/356 X |
| 4,250,626 | 2/1981 | Lazar | 33/361 X |
| 4,255,866 | 5/1981 | Sears | 33/361 |
| 4,774,766 | 10/1988 | Posseme | 33/361 |
| 4,920,656 | 1/1990 | Cross | 33/355 R |
| 4,953,304 | 9/1990 | Raitmaa et al. | 33/355 R |
| 5,175,936 | 1/1993 | Sato | 33/361 |
| 5,187,871 | 2/1993 | McDermott | 33/354 |

FOREIGN PATENT DOCUMENTS 1219080  3/1986  U.S.S.R. ......................... 33/355 R

*Primary Examiner*—Alvin Wirthlin
*Attorney, Agent, or Firm*—Leonard Bloom

[57] ABSTRACT

An electronic audio/visual direction indicator for underwater or other types of navigation which gives unobtrusive and continuous directional feedback without the need for manual manipulation.

37 Claims, 13 Drawing Sheets

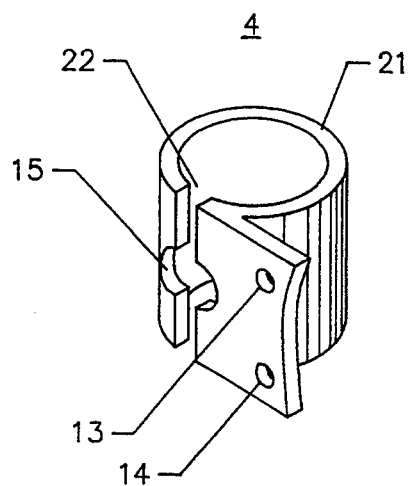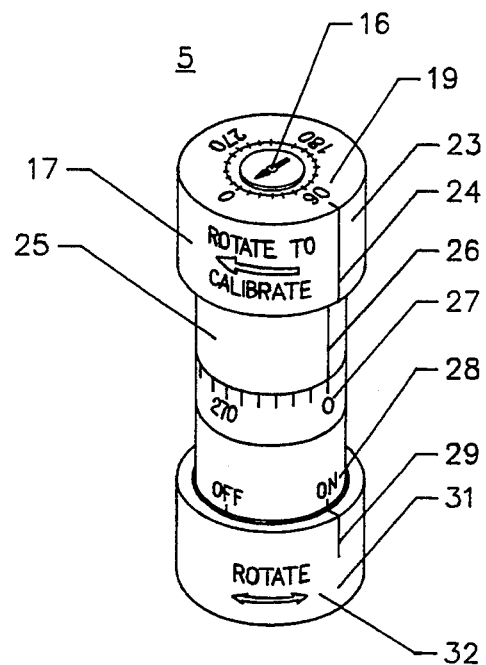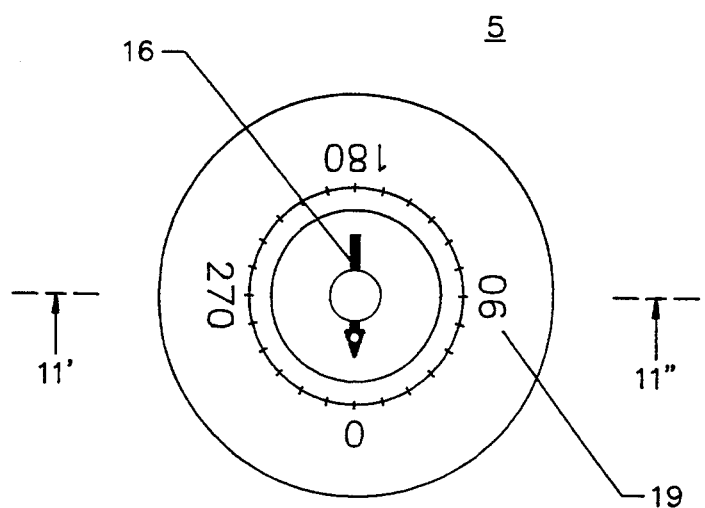

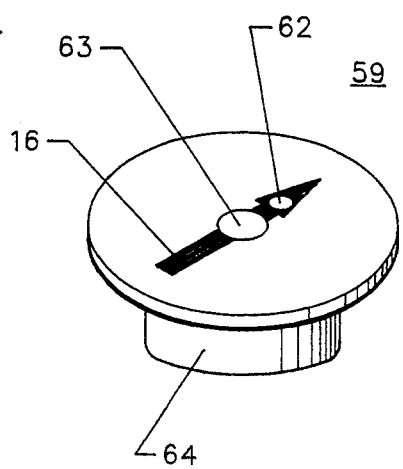
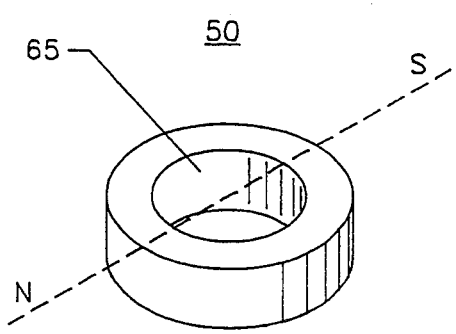
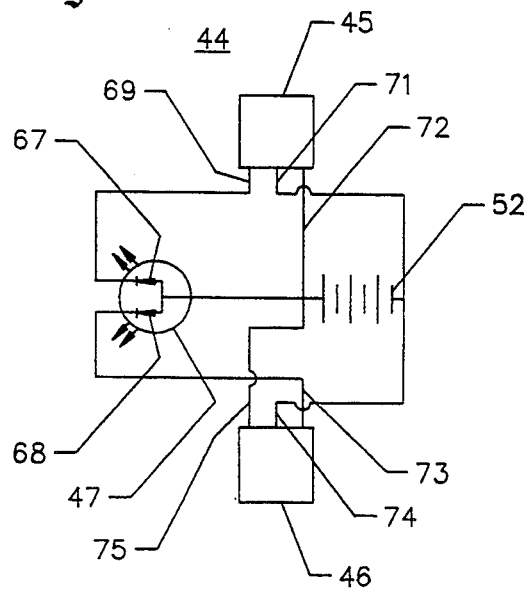
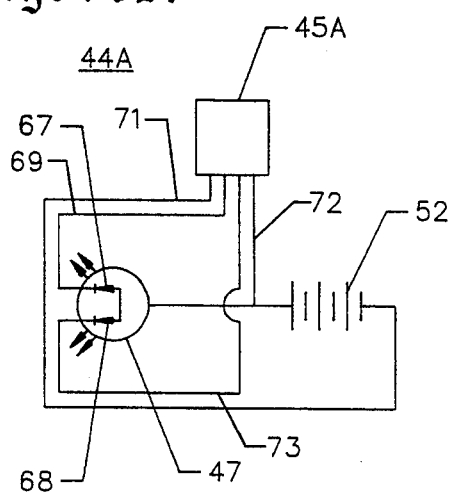
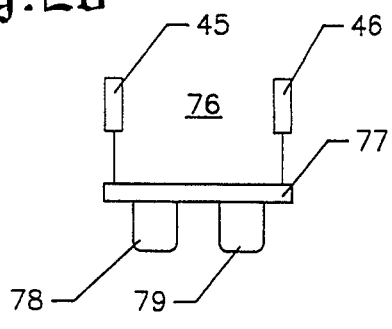

DIRECTION INDICATOR FOR NAVIGATION

BACKGROUND OF THE INVENTION

1. Field of the Invention

The present invention relates to navigation and, in particular, to a visual, audible, or tactile directional indicator for navigation, and especially for underwater navigation.

2. Description of the Background

Safe and accurate underwater navigation requires the use of a compass, and there are many commercially available varieties suited for underwater use. Conventional underwater compasses are analog indicators which attach to the wrist. However, reading of the wrist-mounted compasses is difficult. The diver cannot focus his/her eyes on the indices of the compass while his/her head and hands are moving in the water. Hence, the diver must be repositioned to allow for an accurate reading, and the wrist must be situated such that the compass indicia are in focus. The diver's attention must be directed entirely to the compass during the reading. Consequently, he/she may overlook surrounding dangers or may stray from the immediate path and collide with underwater rocks, etc. Many other problems arise. For instance, any analog compass will require the diver to memorize critical directions such as the heading back to shore. Such numbers are easily confused or forgotten, and the results can be catastrophic. Moreover, the compass becomes useless without ambient or supplemental lighting.

There have been efforts to improve upon the wrist mounted compasses. For instance, mask compasses are shown and described in U.S. Pat. No. 4,953,304 issued to Raitmaa and U.S. Pat. No. 3,210,859 issued to Fisk. In both designs, a compass is mounted on a support assembly which is pivotally attached to the diving mask. The compass can be pivoted from a stored position on top of the mask to a viewing position at the face of the mask. This maintains a predetermined optical path length, hence there is no need to refocus the compass at each use. However, the advantages stop there. Both patented designs require an optical lens to permit the eye of the diver to focus upon the intricate markings, and the proper numerical headings must still be memorized. Moreover, the compasses substantially block the diver's vision from one eye. This is undesirable because an accurate depth perception is required to prevent underwater collisions. Further problems often arise. For instance, if the mask becomes dirty or foggy, the compass may be obscured, and the diver can no longer use the navigational device. If salt water enters the diver's eyes, focussing may become impossible. After prolonged use, the diver suffers from eye fatigue since one eye is directed to the compass. Manufacturing problems also arise. For example, the requisite lenses are expensive, and the devices must be calibrated for a variety of masks and face shapes to insure the proper focus.

The prior art also includes electronic devices which create a compass using a magnetic sensor coil of wire and an electronic circuit rather than a rotating magnet. These are known as "Fluxvalve" or "Earth inductor" designs, and signals generated by the circuit are capable of activating digital or analog displays. An example of the "Earth inductor" is described in U.S. Pat. No. 4,139,951 issued to Cunard, said patent herein being incorporated by reference.

SUMMARY OF THE INVENTION

It is, therefore, an object of the present invention to provide a safe, accurate, and reliable visual direction indicator for underwater or other navigation which gives a continuous indication of direction without requiring 100% attention.

It is another object to provide a completely unobtrusive navigation device as described above which requires no memorization of critical headings and no manual manipulation for use thereof.

It is still another object to provide an economical underwater navigation device which does not require the analog indicia of the prior art compasses, nor the expensive lenses which are necessary to read the indicia underwater, and which do not have to be calibrated for a variety of masks and face shapes to insure the proper focus.

It is another object to provide a visual indication of direction which can be understood regardless of typical diving conditions such as a foggy mask or blurred vision.

It is another object of this invention to use the Earth's magnetic field to interact with a coiled wire circuit to selectively activate a directional signal.

It is still another object of the invention to provide an indication of direction as described above through any one or a combination of audible, tactile, or color signals.

In accordance with the above-described and other objects, the present invention provides a navigation device including various electronic embodiments each including a housing assembly and an electronic assembly for indicating when the housing assembly is oriented at a predetermined angle relative to the Earth's magnetic field. The electronic assembly includes a direction indicator coupled to a power source via a control circuit. The control circuit selectively energizes the direction indicator when the housing assembly attains the predetermined angle relative to the Earth's magnetic field, thereby providing a directional indication to the user. The direction indication may take the form of an audible, visible, or tactile signal.

The invention may also be achieved by modifying a magnetic sensor coil type electronic compass as shown in prior art U.S. Pat. No. 4,139,951 issued to Cunard to emit a directional signal. The coil and circuit assembly of the prior art design creates a distinct electrical signal to activate each direction of the digital display. This distinct electrical signal could simultaneously activate a colored light, tactile vibrator, or audible emitter each time a selected direction was displayed.

The invention may also be practiced without electronics, and as such comprises an enclosed housing assembly, a light source (which may be internal or ambient), a magnet assembly rotatably mounted in the housing assembly for maintaining an alignment with Earth's magnet field, and an indicator assembly mounted within said housing assembly. The indicator assembly includes a light altering means for altering light from said light source in response to a rotational position of said magnet assembly to thereby provide a direction signal indicative of the magnet assembly being oriented at a predetermined angular position relative to said Earth's magnetic field.

The invention is set forth in various contexts such as a diving mask, a wrist-mounted embodiment, and a flashlight embodiment.

BRIEF DESCRIPTION OF THE DRAWINGS

Other objects, features, and advantages of the present invention will become more apparent from the following detailed description of preferred embodiments and certain modifications thereof when taken together with the accompanying drawings in which:

FIG. 8 is an isolated perspective view of support assembly 4 of FIGS. 1-5;

FIG. 9 is a perspective view of indicator module 5 of FIGS. 1-7 removed from within support assembly 4;

FIG. 10 is a top view of the indicator module 5 of FIGS. 1-7 showing azimuthal indices 19 and compass arrow 16;

FIG. 16 is an isolated perspective view of the magnet hub 59 as used in the magnet assembly 39 of FIGS. 14 and 15;

FIG. 17 is an isolated front view of an axle 58 as used in the magnet assembly 39 of FIGS. 14 and 15;

FIG. 18 is an isolated perspective view of ring-shaped magnet 50 as used in the magnet assembly 39 of FIGS. 14 and 15;

FIG. 19 is an electrical schematic of one embodiment of the circuit assembly 44 of FIGS. 12 and 13;

FIG. 19a is an electrical schematic of an alternate embodiment of the circuit assembly 44;

FIG. 20 is a front view of a first alternative circuit assembly 76 which may be used in place of circuit assembly 44 in the indicator module 5 of the present invention;

DETAILED DESCRIPTION OF THE PREFERRED EMBODIMENTS

Figure 1:
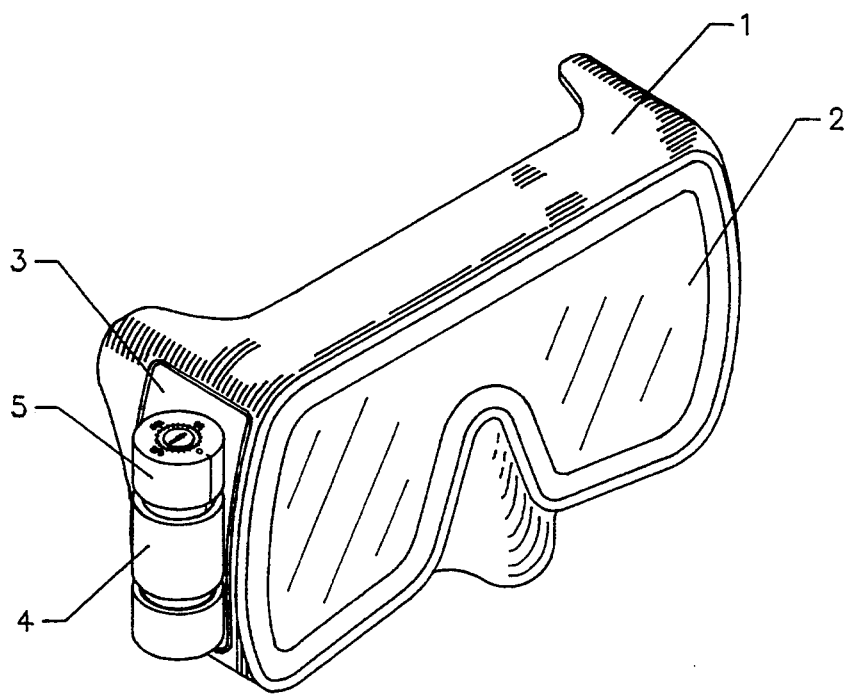
FIG. 1 is a perspective view of a diving mask mounted navigation device 10 according to one embodiment of the present invention.

FIG. 1 is a perspective view of a mask mounted navigation device 10 according to one embodiment of the present invention. Navigational device 10 includes a conventional diving or other mask 1 with front window 2 and at least one lateral side window 3.

A cylindrical support assembly 4 holds a visual indicator module 5 in position on the side of mask 1 proximate side window 3 for viewing therethrough. Support assembly 4 permits the indicator module 5 to be rotated as required by the user.

Figure 2:
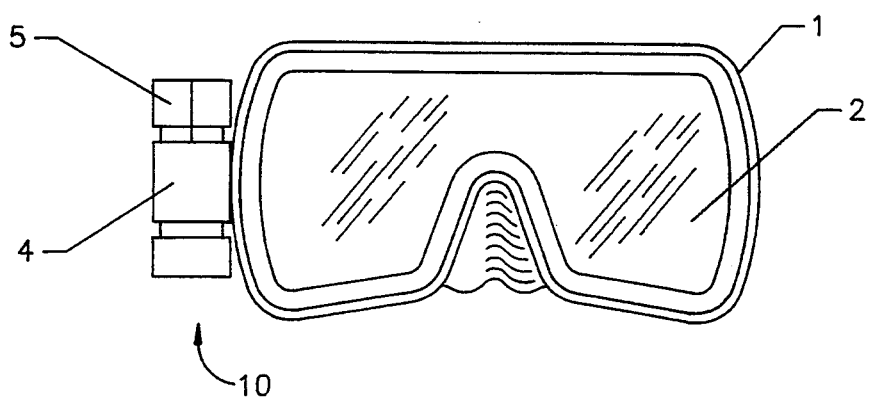
FIG. 2 is a front view of the mask mounted navigation device 10 of FIG. 1.
Figure 3:
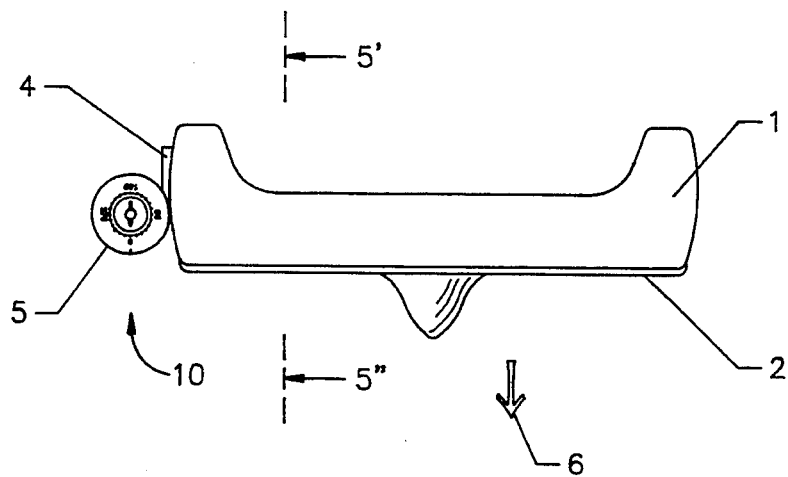
FIG. 3 is a top view of the mask mounted navigation device 10 of FIGS. 1 and 2.
Figure 4:
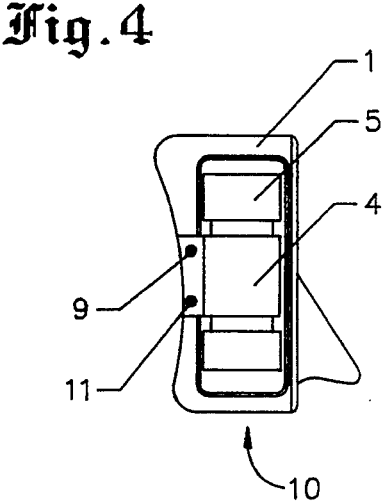
FIG. 4 is a left side view of the mask mounted navigation device 10 of FIGS. 1-3.

FIGS. 2-4 are a front view, a top view, and a side view, respectively, of the mask-mounted navigational device 10 according to the embodiment of FIG. 1. These drawings further show the unobstructive placement of support assembly 4 and indicator module 5. As shown in FIG. 3, the forward direction is identified by reference arrow 6. As shown in FIG. 4, support assembly 4 may be secured to mask 1 with an upper mounting screw 9 and lower mounting screw 11. In this particular configuration, indicator module 5 remains vertical whenever mask 1 is vertical.

Figure 5:
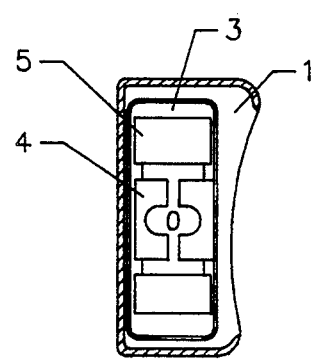
FIG. 5 is a cross-sectional view of the dive mask 1 of FIGS. 1-4 taken along line 5'-5" of FIG. 3, the mask mounted navigation device 10 being visible through side window 3.

FIG. 5 is a cross-sectional view of mask 1 taken along line 5'–5" of FIG. 3. The view of indicator module 5 through side window 3 is representative of the user's lateral view as he/she looks out of side window 3 while wearing the mask 1.

Figure 6:
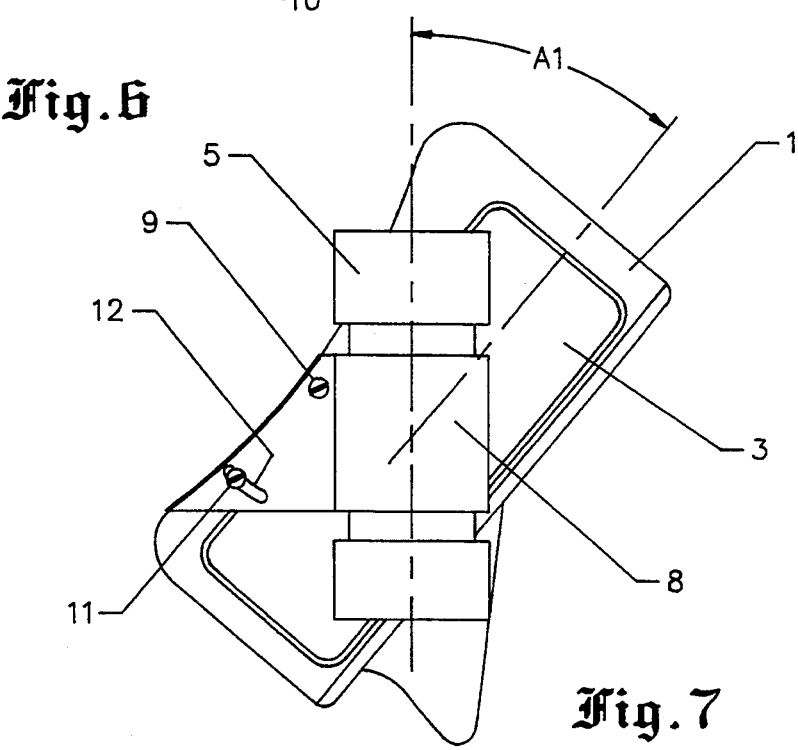
FIG. 6 is a left side view of an alternative support assembly 8 which allows tilting of the indicator module 5 relative to mask 1.

FIG. 6 shows an alternative support assembly 8 which allows tilting of the indicator module 5 relative to mask 1. As shown, support assembly 8 pivots along with indicator module 5 so that when the user of the mask is swimming with his/her head tilted downward, the navigational device indicator module 5 can be pivoted to maintain a vertical orientation. This is necessary to maximize the accuracy of the device. The pivoting feature is accomplished with an elongated lower mounting slot 12. Upper mounting screw 9 is still used to hold support assembly 8 in position. Lower slot mounting screw 11 (which may be a wing screw to allow manual adjustment) is loosened to permit pivoting of the support assembly 8. Lower slot mounting screw 11 is then tightened to lock support assembly 8 in the desired position.

Figure 7:
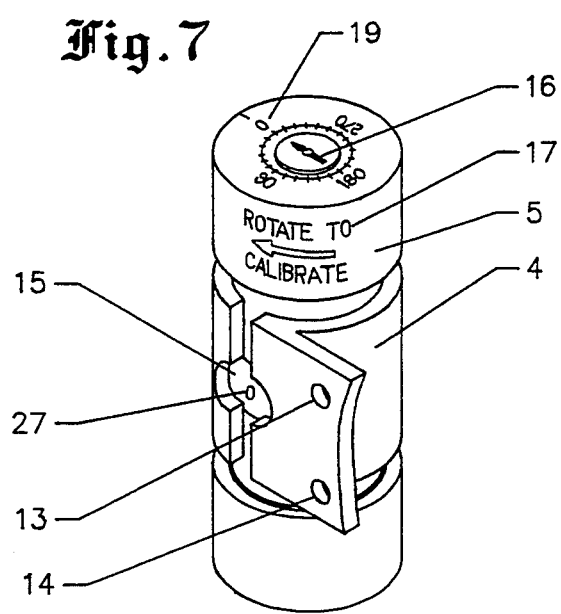
FIG. 7 is a detailed perspective view of the indicator module 5 and support assembly 4 of FIGS. 1-5.

FIG. 7 is a detailed perspective view showing the indicator module 5 and support assembly 4. Both components may be molded from high impact clear transparent plastic. Alternatively, support assembly 4 may be molded from black plastic to improve the user's ability to see the visual direction indications.

FIG. 8 is an isolated perspective view of support assembly 4. Support assembly 4 includes an annular plastic body 21 formed with a slotted opening 22. Slotted opening 22 permits body 21 to act as a resilient clamp for indicator module 5 while still permitting it to rotate when twisted by the user. Support assembly 4 also includes top and bottom mounting holes 13 and 14, respectively, by which it can be fastened to mask 1 or elsewhere. As is apparent from FIG. 5, either of holes 13 or 14 can be shifted or slotted to achieve a desired tilt. Slot 22 opens centrally to a viewing hole 15 which allows the user to observe the indicator module 5.

FIG. 9 is a perspective view of indicator module 5 removed from within support assembly 4. The indicator module 5 includes a compass cap 23 which screws onto a housing 25, a battery cap 31, and a compass arrow 16. Compass cap 23 is transparent plastic and encloses an analog compass arrow 16 which is rotatably mounted in indicator module 5. Arrow 16 remains visible beneath the transparent plastic, and the interior or exterior surface of indicator module 5 is defined by 360° azimuthal indicia 19 surrounding the compass arrow 16 to identify direction. Indicia 19 may alternatively define compass directions, i.e., north, south, east, and west. A like set of azimuthal indicia 27 encircle the indicator module 5 below the compass cap 23, and a portion of these azimuthal indicia 27 may be viewed by the user through viewing hole 15 in support assembly 4 when mounted on mask 1. It is important to note that azimuthal indicia 19 may be rotated with compass cap 23 relative to azimuthal indicia 27. In addition, instructional indicia 17 are included to describe the desired direction of rotation of indicator module 5 within support assembly 4 when calibrating the navigation device. Proper rotation avoids accidental unscrewing of compass cap 23.

In operation, the user selects a desired forward reference heading by rotating indicator module 5 within support assembly 4 in the direction marked by indicia 17 until compass arrow 16 is aligned with the desired angular indicia 19, thereby indicating the desired heading in terms of a degree offset from a northerly direction. Indicator module 5 displays additional directional indications to the user through window 15 (and/or audibly or tactually transmits the additional directional indications). The displayed additional directional indications in part include the portion of azimuthal indicia 27 which can be seen through the window 15. The directional instructions also may include a luminous indication to be described.

A cap position line 24 is provided on compass cap 23, and a housing position line 26 is provided on housing 25 to facilitate proper alignment between the azimuthal indices 19 and 27. The proper alignment relationship is defined by the angular relationship between the forward reference direction arrow 6, support assembly viewing hole 15, and azimuthal indices 19 and 27. In the illustrated embodiment, cap position line 24 and housing position line 26 should be aligned to calibrate the two azimuthal indices 19 and 27 at 90° and 0°, respectively. Such alignment is necessary to assure consistent readings regardless of whether the user is looking directly at compass cap 23 or into support assembly viewing hole 15. The above-described alignment should be set when indicator module 5 is factory assembled, and the user should normally have no need to change this alignment.

FIG. 10 is a top view of indicator module 5 showing azimuthal indices 19. Compass arrow 16 is clearly visible through compass cap 23.

Figure 11:
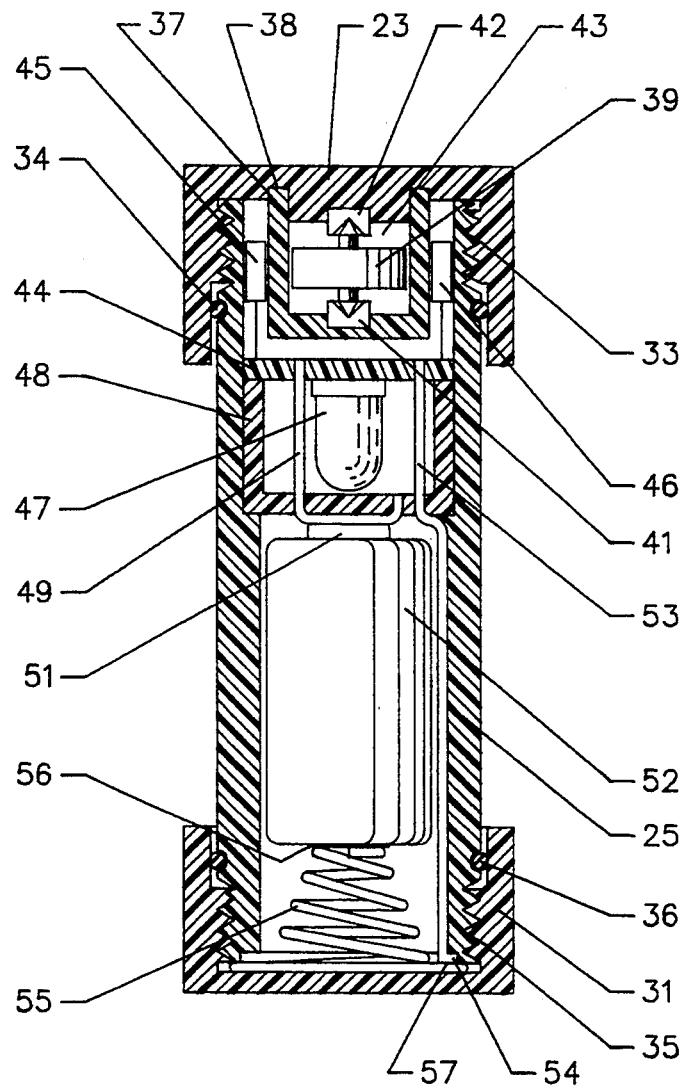
FIG. 11 is a cross-sectional view of the indicator module 5 taken along line 11'-11" of FIG. 10.

FIG. 11 is a cross-sectional view taken along line 11'–11" of FIG. 10. It shows housing 25 with a battery cap 31 threaded to the bottom end via battery cap threads 35. Likewise, compass cap 23 is threaded onto the top end via compass cap threads 33. Watertight sealing is assured at battery cap 31 due to a battery cap O-ring 36 and likewise at compass cap 23 due to a compass cap O-ring 34. A battery 52 is situated within housing 25 and is seated therein on a helically wound conical spring 55 which makes continuous contact with the base of battery 52 at contact point 56. Spring 55 also makes contact with a contact pad or leg 54 at contact point 57, contact pad 54 in turn being connected to an extending conductive trace 53.

With concurrent regard to FIG. 9, battery cap 31 is also provided with instructional indices 32 and 29 to show the proper direction of rotation to turn the navigation device "on" or "off" by selectively completing an electrical connection with battery 52. Specifically, when rotational indices 29 are brought into alignment with the "OFF" indicia of "ON/OFF" indices 28 as shown on housing 25, then conical spring 55 separates from leg 54 at contact point 57 to break the electrical connection. When rotational indices 29 are brought into alignment with the "ON" indicia 28, the conical spring 55 makes contact with leg 54 at contact point 57 to complete the electrical connection. Meanwhile, a battery contact 49 is connected to the opposite polarity of battery 52 at contact point 51 at all times. Hence, when battery cap 31 is in the "ON" position, current flows through battery contact 49 and conductive trace 53 supplying power to a circuit assembly 44.

Circuit assembly 44 includes a pair of Hall effect switches 45 and 46 and bi-color light emitting diode 47.

Figure 12:
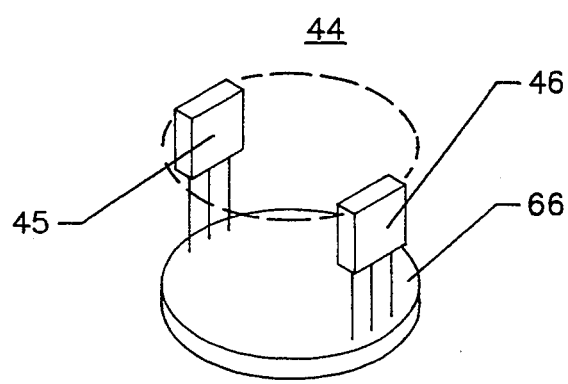
FIG. 12 is an isolated perspective view of one embodiment of a circuit assembly 44 as used in the indicator module 5 of FIGS. 1-11.
Figure 13:
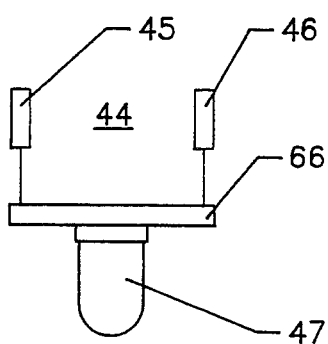
FIG. 13 is a side view of the circuit assembly 44 of FIG. 12.

FIGS. 12 and 13 are isolated perspective and front views, respectively, of one embodiment of circuit assembly 44 in which the Hall effect switches 45 and 46 are mounted on one side of a rotating disk-shaped circuit board 66, and bi-color light emitting diode 47 is mounted on the other side of circuit board 66. Hall effect switches 45 and 46 are used in conjunction with a magnet assembly 39 to control the power applied to bi-color light emitting diode 47.

Figure 14:
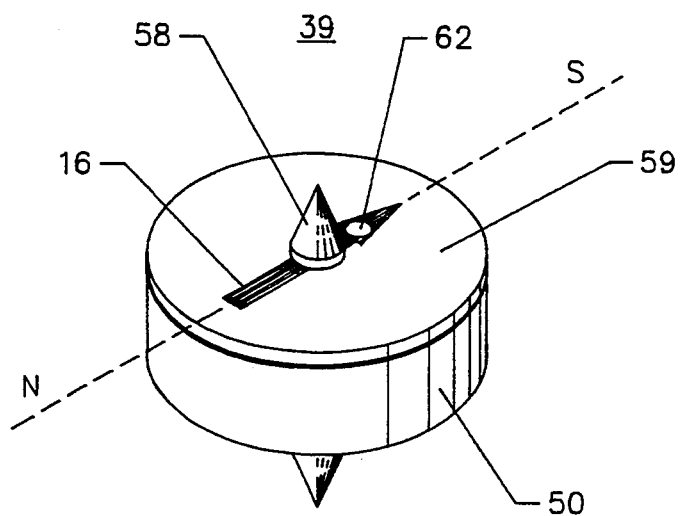
FIGS. 14 and 15 are perspective and bottom views, respectively, of a magnet assembly 39 as used in the indicator module of FIGS. 1-11.
Figure 15:
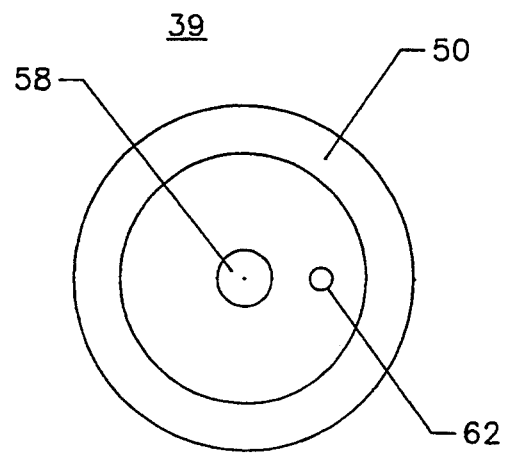

FIGS. 14 and 15 are perspective and bottom views, respectively, of magnet assembly 39 showing compass arrow 16 and an annular magnet 50 mounted on an axle 58, the magnet being magnetized across its diameter along line N-S. An overlying hub 59 is mounted coaxially with magnet 50 on axle 58, and a hub sensor hole 62 is slightly offset from axle 58.

FIG. 16 is an isolated perspective view of the magnet hub 59 of FIGS. 14 and 15 showing a centrally located axle hole 63 to accept axle 58 and offset hub sensor hole 62 which permits ambient light or infrared energy to pass through magnet assembly 39. Compass arrow 16 is located on the disk-shaped top of hub 59 and a downwardly extending central boss 64 is used to position hub 59 in magnet 50.

FIG. 17 is an isolated front view of axle 58 showing a preferred elongate symmetrical shape with opposing ends both tapering to a point.

FIG. 18 is an isolated perspective view of ring-shaped magnet 50 suitable for use in the magnet assembly 39 of FIG. 14. Magnet 50 has a central hole 65 conforming to the central boss 64 of hub 59. Magnet 50 is preferably constructed of rare earth materials such as neodymium, iron, boron, or samarium cobalt. Rare earth magnets are preferred because they are both powerful and lightweight.

Referring back to FIG. 14, axle 58 is press fit into hole 63 of hub 59, and hub base 64 is press fit into magnet hole 65 with arrow 16 directed towards the south pole of magnet 50. This completes the magnet assembly 39.

Referring back to FIG. 11, the completed magnet assembly 39 is then seated within a magnet cup 37, which is in turn permanently bonded to transparent compass cap 23 at sealing edge 38. Within magnet cup 37, the magnet assembly 39 freely rotates in upper and lower jeweled bearings 42 and 41, respectively, until arrow 16 aligns with the Earth's north-south magnetic field and is pointed directly northward. A light oil 43 may be provided in magnet cup 37 to reduce unwanted movement of magnet assembly 39. As in any conventional compass, this assured alignment may be used to determine any azimuthal direction.

The above-described design of rare earth magnet assembly 39 provides a low rotational moment of inertia and a large applied torque, thereby assuring maintained alignment with the Earth's magnetic field. The large torque quickly returns magnet assembly 39 to alignment whenever it is rotated away from the Earth's polarity. In addition, the low rotational moment of inertia contributes to the maintained alignment even if the navigation device is tilted and axle 58 is not vertical. This is an essential feature of the invention since it is critical that the navigation device continue to function despite various orientations. It is common for scuba divers and others using a navigation device to lose their sense of vertical orientation, and the navigation device of the present invention will continue to operate even when the diver is tilted up to 35° from vertical.

FIG. 19 is an electrical schematic of one embodiment of a circuit assembly 44 which is capable of driving LED 47 in accordance with feedback from Hall effect switches 45 and 46.

Circuit assembly 44 is preferably etched in circuit board 66 and operates to control the power applied to bi-color light emitting diode 47. Hall effect switch 45 includes three terminals. Terminal 71 is a ground terminal connected to the negative of battery 52. Terminal 72 is the input terminal connected to the positive battery 52. Terminal 69 is the output terminal which feeds the cathode of internal red portion 67 of light emitting diode 47. Likewise, Hall effect switch 46 includes a ground terminal 74 connected to the negative of battery 52, an input terminal 75 connected to the positive of battery 52, and an output terminal 73 which feeds the cathode of internal green portion 68 of light emitting diode 47. As the north pole of magnet assembly 39 rotates within indicator module 5 relative to circuit assembly 44 and approaches switch 45, switch 45 is gated "on" to illuminate a red light portion 67 of bi-color light emitting diode 47. Similarly, as the north pole of magnet assembly 39 approaches switch 46, switch 46 is gated "on" to illuminate a green light portion 68 of bi-color light emitting diode 47. Since the north pole of magnet assembly 39 can pass only one switch at a time, only one color (red portion 67 or green portion 68) can be lit at any particular angular position of magnet assembly 39. Circuit assembly 44a could alternatively function with a single Hall effect element 45a integrally contained within a single package. This single Hall effect element 45a would upon sensing one pole of the magnet assembly 39, energize the first direction indicator 67, and upon sensing the remaining pole of magnet assembly 39, energize the second direction indicator 68 (FIG. 19a).

The difference between the angle where the internal red portion 67 of light emitting diode 47 is first lit to the angle where the internal green portion 68 is first lit defines a "differential activation angle." For example, the illustrated Hall effect switches 45 and 46 are located 180° apart on circuit board 66. Consequently, the differential activation angle between colored portions 67 and 68 is approximately 180°, and the magnet assembly 39 must rotate this amount to illuminate both colors. Each color portion 67 and 68 of the light emitting diode 47 may remain lighted over an "activation angle bandwidth," e.g., a range of angular movement of magnet assembly 39. The activation angle bandwidth may be varied by adjusting the geometry of the assembly, the strength of magnet 50, the type of Hall effect switch, etc.

FIG. 20 is a front view of an alternative embodiment of circuit assembly 44. This embodiment is similar to that of FIG. 13, however, the bi-color light emitting diode 47 is replaced by the two tactile vibrating modules 78 and 79 to give a touch sensitive directional indication. Modules 78 and 79 are conventional devices which vibrate at different frequencies to signal which Hall effect switch has been activated, thereby indicating to the user the direction of travel. For example, one suitable design would provide a high frequency vibration as the user maintains a particular preset heading, and a low frequency vibration when the user heads in the opposite direction.

Figure 21:
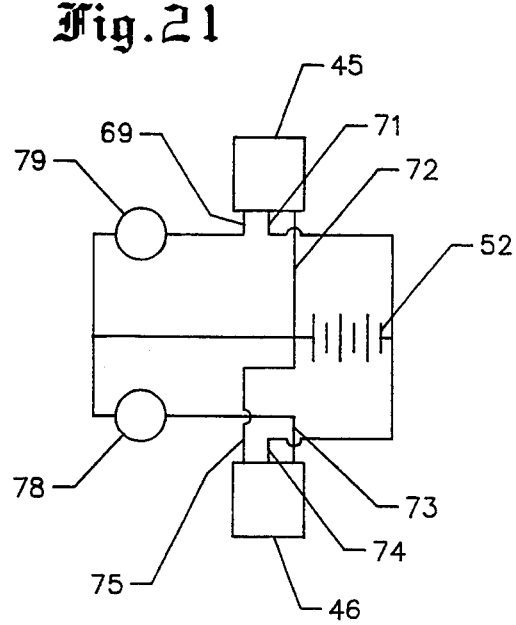
FIG. 21 is a schematic diagram of the circuit assembly 76 of FIG. 20.

FIG. 21 is a schematic diagram of the circuit assembly 76 of FIG. 19 in which the two tactile vibrating modules 78 and 79 are driven by Hall effect switches 45 and 46 to give a touch sensitive directional indication.

It should be noted that the actual circuit assembly may also substitute audible emitters for the tactile vibrating modules 78 and 79 of circuit assembly 76 of FIG. 20. Moreover, any combination of audible emitters, tactile vibrating modules 78, and/or bi-color LEDs 47 (as in circuit assembly 44 of FIG. 12) may be employed to give tactile, visual, and/or audible signals.

Figure 22:
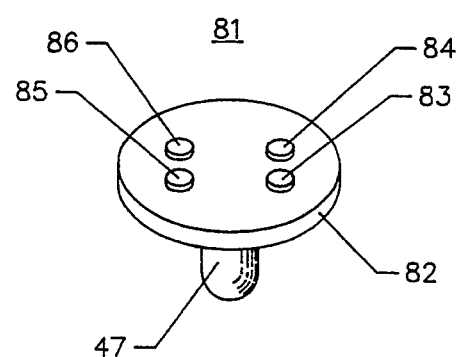
FIGS. 22 and 23 are a perspective view and a front view, respectively, of a second alternative circuit assembly 81 which may be used in place of circuit assembly 44 in the indicator module 5 of the present invention.
Figure 23:
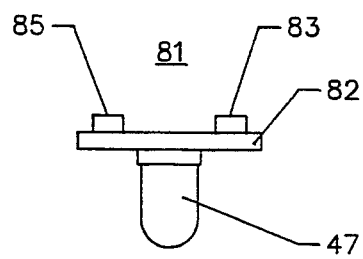

FIGS. 22 and 23 are a perspective view and a front view, respectively, of a third alternative embodiment 81 of circuit assembly 44 in which an infrared LED 83 is mounted on the top-side of disk-like circuit board 82 to project infrared energy towards the underside of magnet hub 59. A matching piece of reflective material may be placed on the underside of hub base 64 over hub sensor hole 62 (see FIG. 15). This way, the infrared energy from LED 83 will be reflected back towards circuit board 82. A light sensitive transistor 84 is mounted on circuit board 82 next to LED 83. Complementary infrared LED 85 and light sensitive transistor 86 are provided to indicate a second predetermined direction.

Figure 24:
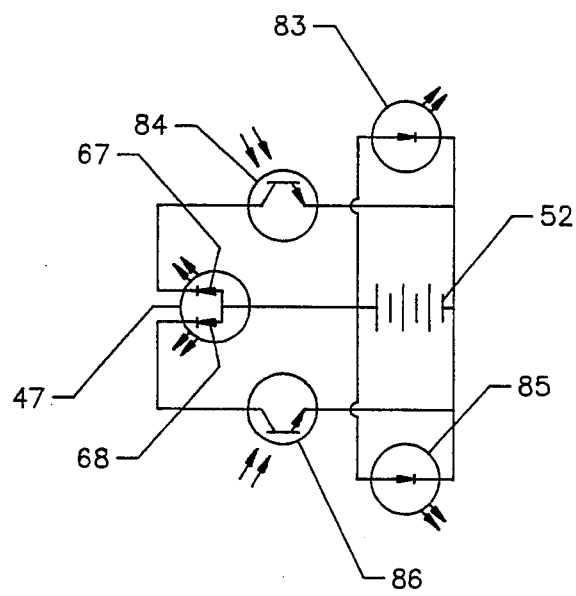
FIG. 24 is an electrical schematic of the circuit assembly 81 of FIGS. 22 and 23.

FIG. 24 is an electrical schematic of the circuit assembly 81 of FIGS. 22 and 23. As shown, transistor 84 is coupled to the bi-color LED 47 such that light reflected from LED 83 will activate transistor 84, thereby illuminating one of the LED 47 color portions 67. An identical circuit including infrared LED 85 and infrared detector 86 is coupled to the other color portion of bi-color LED 47 such that light reflected from LED 85 will activate transistor 86, thereby illuminating color portion 68.

Assuming the navigation device is intended only for daytime use, the infrared LEDs 83 and 85 and the reflector over hub sensor hole 62 can be omitted. Instead, ambient light can be employed since ambient infrared light energy will pass through hub sensor hole 62 to activate infrared transistor 84 or 86, thereby illuminating the appropriate visible color or sounding the appropriate audible frequency signal.

Figure 25:
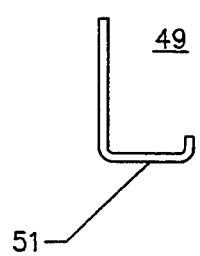
FIG. 25 is an isolated side view of the battery contact 49 shown in FIG. 11.

FIG. 25 is an isolated side view of a generally L-shaped battery contact 49 as in FIG. 11 with contact point 51 indicated thereon. Contact point 51 makes electrical contact with one of the battery 52 terminals in the embodiment of FIG. 11.

Figure 26:
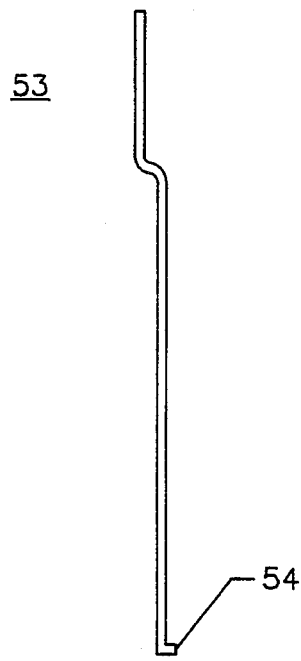
FIG. 26 is an isolated front view of the conductive trace 53 shown in FIG. 11.

FIG. 26 is an isolated front view of conductive trace 53 as in FIG. 11 which is formed with a short perpendicular contact leg 54.

Figure 27:
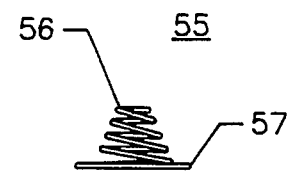
FIG. 27 is an isolated side view of a conical contact spring 55 as in FIG. 11.

FIG. 27 is an isolated side view of a conical contact spring 55 as in FIG. 11 having contact point 57 indicated thereon. Contact point 57 makes electrical contact with contact leg 54 of conductive trace 53 in the embodiment of FIG. 11, and contact point 56 of spring 55 makes electrical contact with the other of the two battery 52 terminals.

Figure 28:
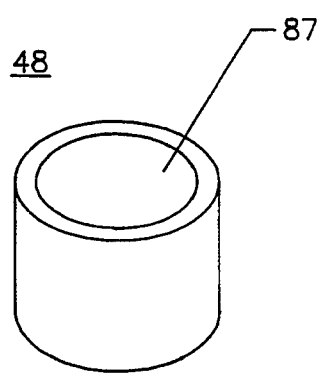
FIGS. 28, 29, and 30 are a perspective view, a top view, and a cross-sectional side view, respectively, of a transparent circuit cup 48 as in FIG. 11.
Figure 29:
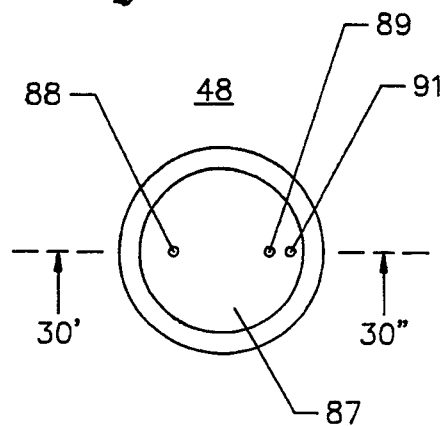
Figure 30:
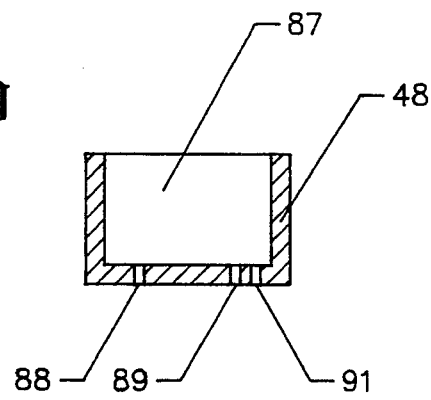

FIGS. 28, 29, and 30 are a perspective view, a top view, and a cross-section side view, respectively, of a transparent circuit cup 48 as in FIG. 11 which attaches to the underside of circuit board 44. FIG. 30 is a cross-sectional view taken across line 30′ and 30″ of FIG. 29. As seen in FIG. 28, the cup 48 provides a central hollow 87 for housing the bi-color light emitting diode 47 or other appropriate signal components. As seen in FIGS. 29 and 30, a plurality of holes is provided through the bottom wall of CUD 48, including holes 88 and 89 which allow passage of the battery contact 49, and hole 91 which allows passage of the conductive trace 53.

Figure 31:
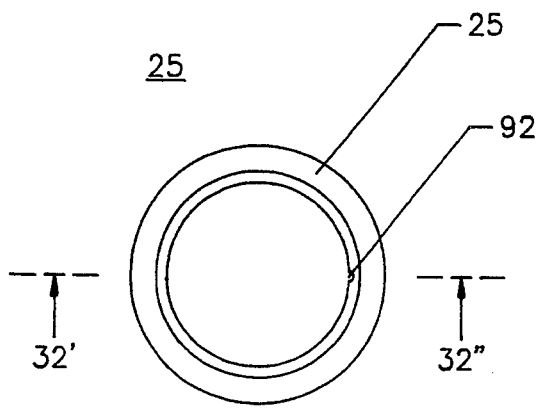
FIGS. 31 and 32 are an isolated top view and a side cross-sectional view, respectively, of the housing 25 as in FIG. 11.
Figure 32:
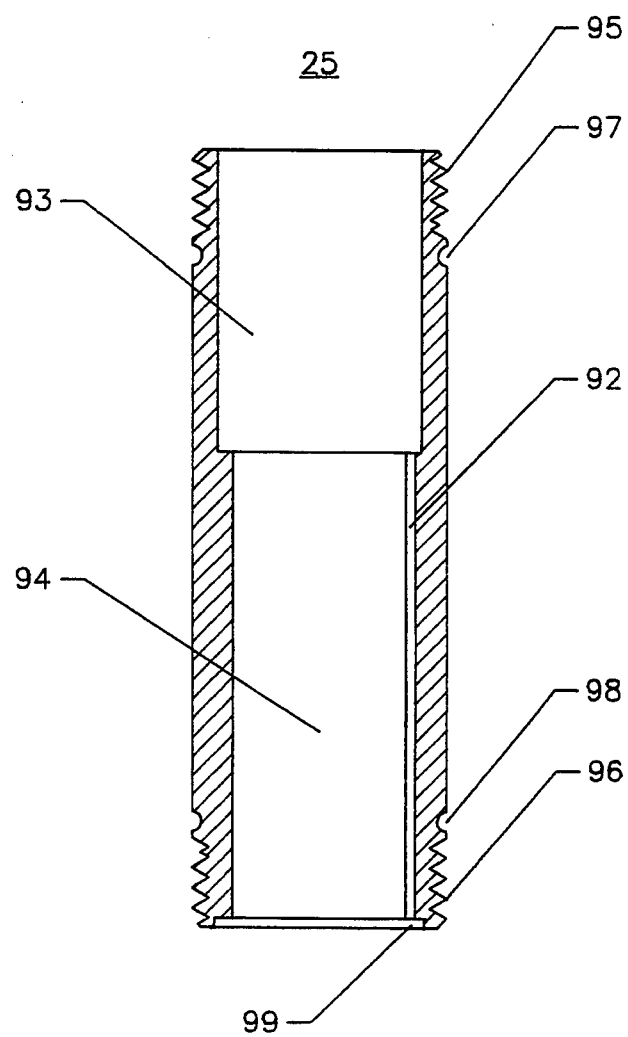

FIGS. 31 and 32 are isolated top view and side cross-sectional views, respectively, of the housing 25 as in FIG. 11. FIG. 32 is a cross-sectional view taken across the line 32′–32″ of FIG. 31. As shown in FIG. 31, housing 25 is formed with a slot 92 for seating the elongate conductive trace 53. FIG. 32 shows an expanded compartment 93 for seating the magnet assembly, and a narrower battery compartment 94. Exterior channels 97 and 98 seat the O-rings 34 and 36 which provide a watertight seal.

When the above-described component parts are assembled into the exemplary embodiment of FIG. 11, the operation is described as follows. Compass arrow 16 is initially pointed towards the 0° (or north) direction as indicated by indicia 19 when the user and mask 1 are facing in the same direction. Consequently, the appropriate Hall effect switch 45 or 46 is activated by the magnet 50 and the appropriate signal (color or frequency) is emitted.

In terms of the electrical schematic of the exemplary circuit assembly 44 of FIG. 19, as the north pole of magnet assembly 39 approaches Hall effect switch 45, terminal 69 develops a negative potential with respect to terminal 72. This voltage differential results in the illumination of the red portion 67 of LED 47.

As magnet assembly 39 recedes from Hall effect switch 45, the voltage differential disappears and red portion 67 of LED 47 turns OFF.

An identical situation occurs as the north pole of the magnet approaches and departs Hall effect switch 46 with its negative terminal 74, positive terminal 75, and output terminal 73, thereby energizing and de-energizing the green portion 68 of LED 47.

If the user wishes to reset the heading to a direction other than 0° northward, he/she may rotate the indicator module 5 within support assembly 4 to any desired offset (in terms of degrees) as indicated by the relation between compass arrow 16 and indicia 19. This will in turn offset Hall effect switches 45 and 46, thereby generating the visible/audible directional signals in accordance with the new heading.

Figure 33:
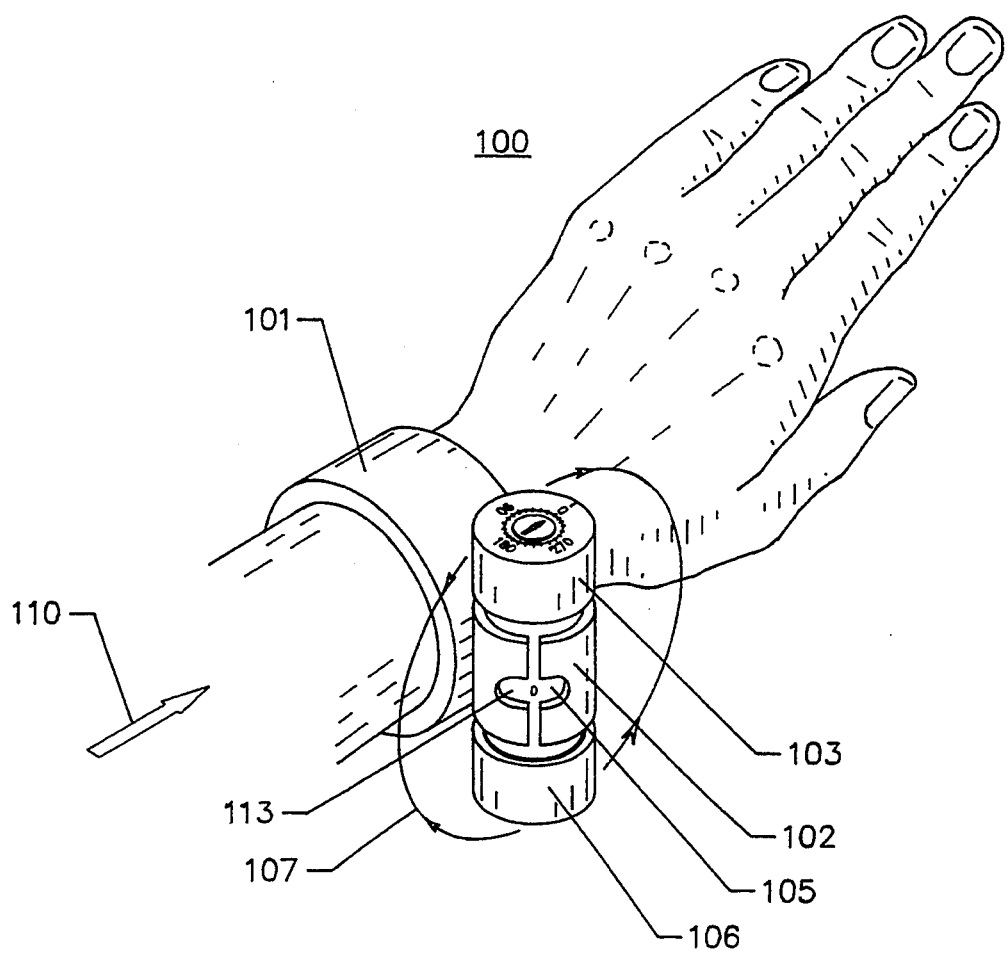
FIG. 33 illustrates an alternative wrist-mounted embodiment of a navigation device 100 in accordance with the present invention.

FIG. 33 illustrates an alternative embodiment of a navigation device 100 in accordance with the present invention which mounts to the wrist. In this embodiment, a wrist clip 101 holds a wrist support assembly 102 by means of a pivoting arrangement which permits support assembly 102 to rotate under gravitational control along the indicated path 107 such that indicator module 103 is able to maintain its vertical orientation permitting internal magnet assembly 39 to continue rotating regardless of the vertical orientation of the user's wrist. Battery cap 106 can be constructed of heavier material such as brass to provide the proper weight at the base of indicator module 103. The forward reference direction for this configuration is indicated by arrow 110. As in the previous embodiments, indicator module indices 105 are optionally viewed through support assembly opening 113.

Figure 34:
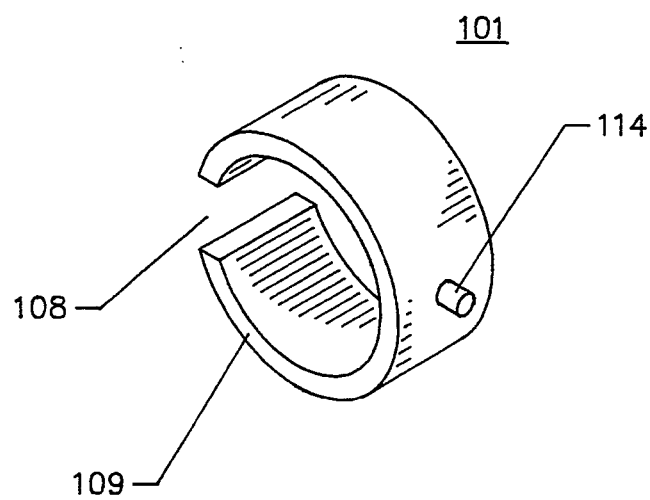
FIG. 34 shows a perspective view of the wrist clip 101 of FIG. 33.

FIG. 34 shows a perspective view of the wrist clip 101 with an extending rivet 114 which pivotally secures support assembly 102.

Figure 35:
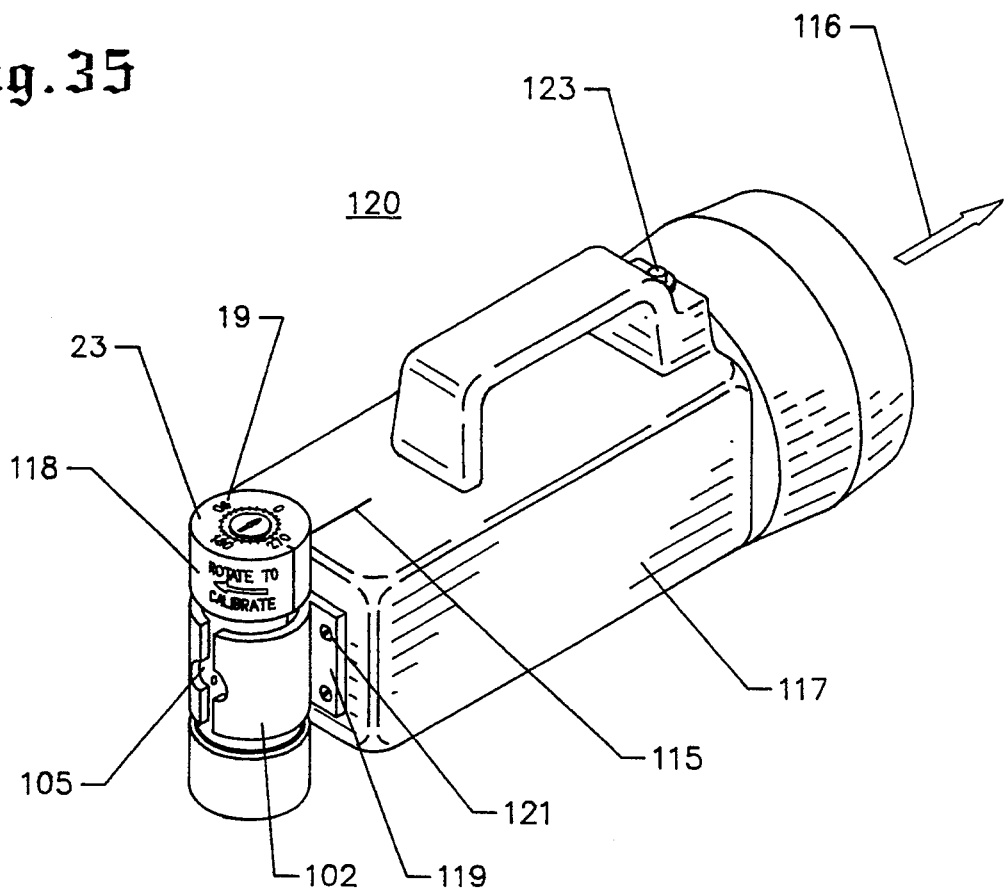
FIG. 35 is a perspective view of an alternative flashlight-mounted embodiment of a navigational device 120 according to the present invention.

FIG. 35 is a perspective view of another embodiment in which a navigational device 120 according to the present invention is mounted on a conventional flashlight. The forward reference direction is indicated by arrow 116. A forward direction scribe line 115 is provided on the case 117 of the flashlight to allow calibration of the azimuthal indices 19 on compass cap 23. Scribe line 115 can alternatively be located on the support assembly 119 itself, but must in any case correspond with the forward direction. Support assembly 119 is attached to case 117 with mount screw 121. As in the embodiment of FIG. 33, indicator module 118 is mounted with the azimuthal indices 105 on housing 25 visible through an opening in support assembly 102, and indicator module 118 is permitted to pivot within support assembly 119, the support assembly 119 in turn being anchored to the flashlight. Screws 121 may be used to attach support assembly 119 to the case 117 of the flashlight.

Figure 36:
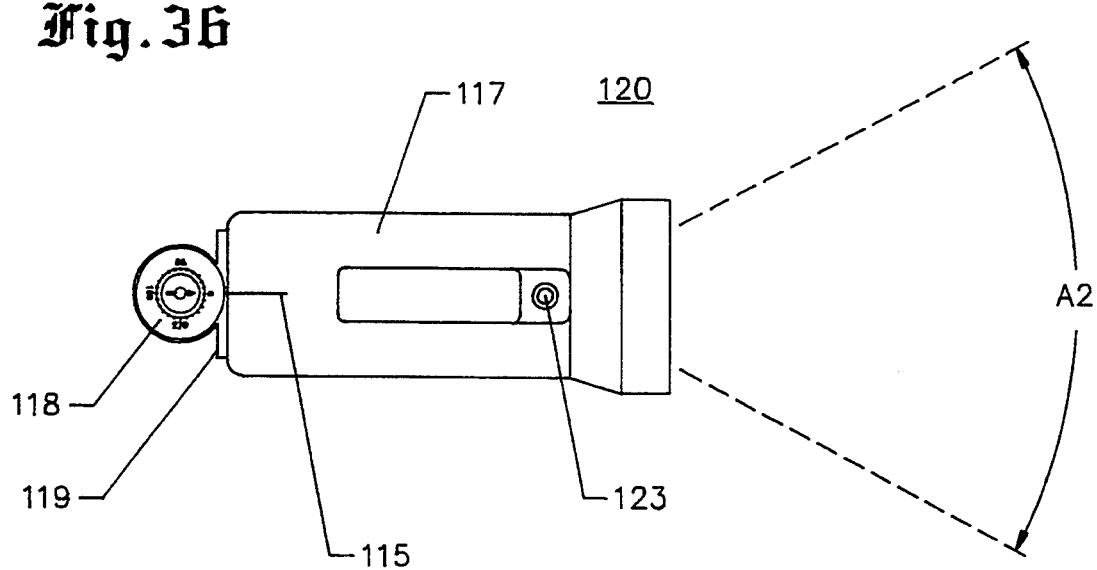
FIG. 36 illustrates the activation angle bandwidth A2 of the flashlight-mounted embodiment of FIG. 35.

FIG. 36 illustrates the activation angle bandwidth A2 of the embodiment of FIG. 34, which angle may be made to conform to the activation angle bandwidth of the projected flashlight beam. In addition to or in substitution for the LED 47 or tactile vibrating modules 78 and 79 of the previous embodiments, the circuit assembly 44 may be modified to control the spot beam of the flashlight. This way, if the user is moving in the selected direction, the flashlight beam and indicator module LED 47 will automatically simultaneously illuminate. As the user rotates the device away from the selected direction, both the indicator module LED 47 and projected beam will extinguish. The user would know if he/she was headed in the return direction from the color of light emitted at the rear of the indicator module from LED 47. Both the selected heading and activation angle bandwidth can be controlled as previously described.

Figure 37:
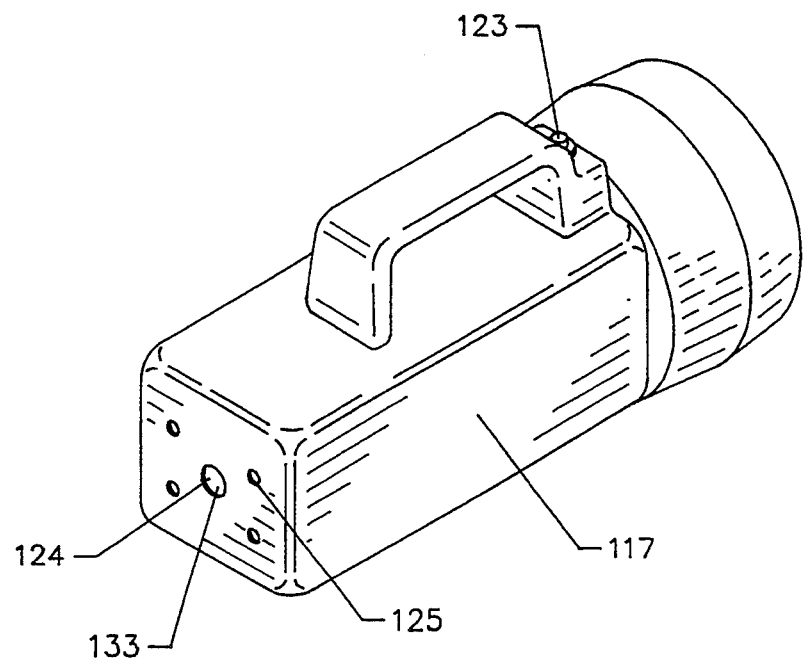
FIG. 37 is an isolated rear view of a flashlight 117 adapted for mounting the navigation device 120 of FIGS. 35 and 36.

FIG. 37 is an isolated rear view of flashlight 117 showing mounting holes 125 which serve to secure support assembly 119. In addition, a phototransistor hole 124 is provided, and a phototransistor 133 is located therein and is coupled to the electrical circuit of the flashlight to selectively interrupt the power supplied to the bulb in accordance with signals from the indicator module 103.

Figure 38:
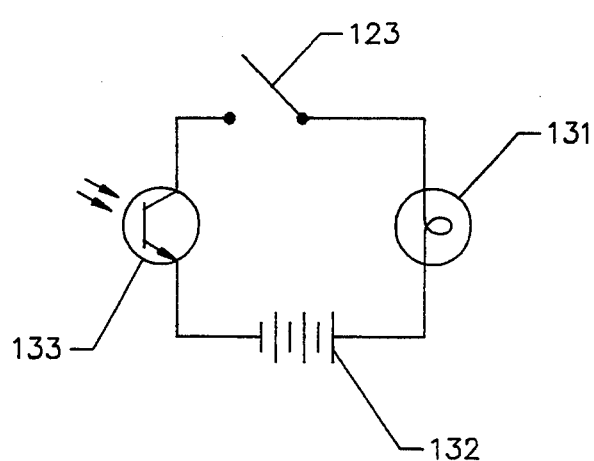
FIG. 38 shows a schematic diagram of a circuit for controlling the flashlight 117 beam in the navigational device 120 of FIGS. 35-37.

FIG. 38 shows a schematic diagram of a circuit for controlling the flashlight 117 beam in the navigational device 120 of FIGS. 35-37. Phototransistor 133 is connected in series with the electrical circuit of the flashlight 117 and battery 132. Thus, if phototransistor 133 is not activated, the flashlight remains "OFF" even if switch 123 is "ON." However, if bi-color light emitting diode 47 of indicator module 118 is illuminated, the light enters flashlight 117 through hole 124 and activates phototransistor 133, which in turn illuminates lamp 131. Of course, support assembly 119 must be transparent plastic or have a rear opening to permit the signal light from indicator module 118 to impinge upon phototransistor 133.

It should be noted that the internal flashlight battery 132 may be used to power indicator module 118 using conventional slip rings or other contacts. In addition, a magnifying lens may be placed in support assembly viewing opening 128 to permit easier viewing of indices 122.

Figure 39:
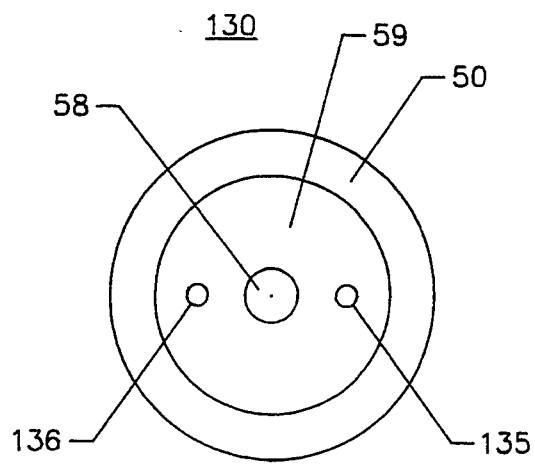
FIG. 39 is a bottom view of an alternative embodiment of a magnet assembly 130 which may be used in lieu of the magnet assembly 39 of FIG. 14.

FIG. 39 is a bottom view of an alternative embodiment 130 of the magnet assembly as in FIG. 14 which additionally includes a red reflective assembly 135 and a diametrically opposite green reflective assembly 136. Both reflective assemblies 135 and 136 may be practiced by overlying a polished reflective surface of a metallic disk with the appropriately colored red or green transparent lens or coating, and both reflective assemblies 135 and 136 may be bonded to the underside of magnet hub 59 by adhesive backing or otherwise.

Figure 40:
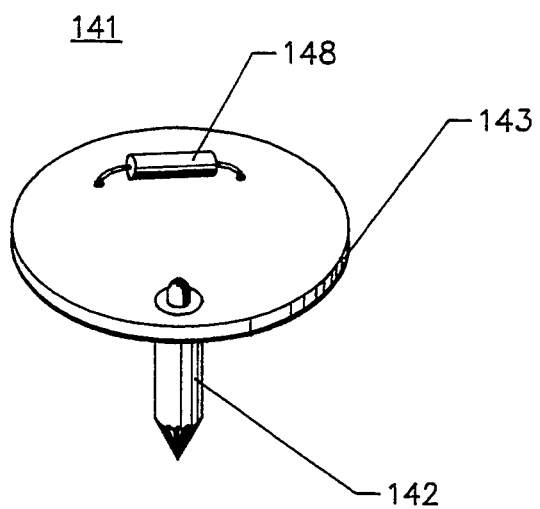
FIG. 40 is a perspective view of a third alternative embodiment of a circuit assembly 141 which may be used in place of circuit assembly 44 in conjunction with the magnet assembly 130 of FIG. 39.

FIG. 40 is a perspective view of an alternative embodiment 141 of the circuit assembly as in FIGS. 12 and 13 which is especially suited for use with the magnet assembly 130 of FIG. 39. In this embodiment, a transparent light tube assembly 142 and current limiting resistor 148 are mounted on the disk-like circuit board 143.

Figure 41:
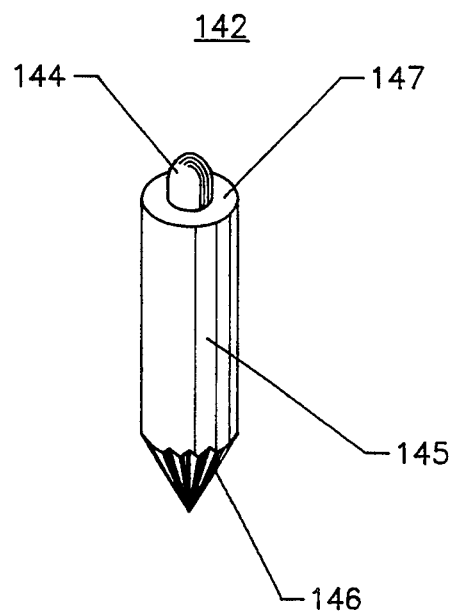
FIG. 41 is an isolated perspective view of a transparent light tube assembly 142 suitable for use with the magnet assembly 130 and circuit assembly 141 of FIGS. 39 and 40.

FIG. 41 is an isolated view of the transparent light tube assembly 142. Light tube assembly 142 includes a transparent plastic rod 145 which is tapered and corrugated at one end to form light diffusive exit flutes 146. A directional yellow light emitting diode 144 is centrally mounted at the other end of transparent plastic rod 145, and the peripheral area around diode 144 is a polished face 147.

Figure 42:
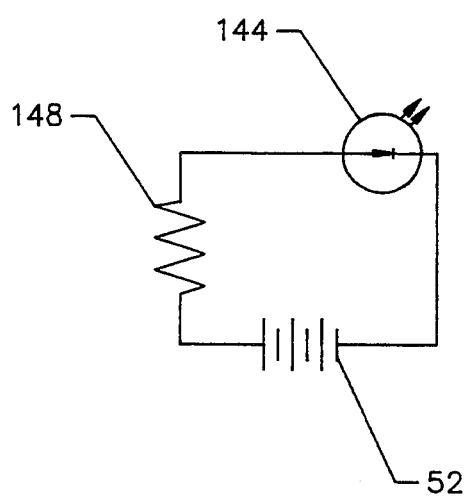
FIG. 42 is an electrical schematic diagram of the circuit assembly 141 of FIG. 40.

FIG. 42 is an electrical schematic diagram of another embodiment 141 of the circuit assembly suitable for use with the reflective magnet assembly 130 of FIG. 39. In this embodiment, there is no separate sensor or power control device. As reflective magnet assembly 130 rotates, light from light emitter 144 reflects from red reflective assembly 135 and impinges upon light entry face 147 of transparent light tube 145 exiting said tube at flutes 146, thereby permitting it to be observed by the user of the device. In passing through the red lens or coating on reflective assembly 135, the yellow light is filtered into red to provide the necessary red signal. Similarly, when passing through green reflective assembly 136, a green signal will be produced. It should be apparent that yellow light emitting diode 144 may be an incandescent light source. Alternatively, this embodiment may omit the light source (e.g., diode 144) completely. For this, the same magnet assembly 39 as in FIG. 14 can be used so long as magnet hub 59 were made opaque.

In operation, magnet assembly 39 would rotate until hole 62 is aligned with light tube 145, now colored transparent red. Ambient underwater light would enter face 147 and exit flutes 146 to signal the diver with a red light.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. For instance, the present invention should not be confined to underwater diving masks or flashlights. It may be mounted on a speargun, boat dashboard, car, etc. Many of the same advantages may be realized regardless of the object on which the device is mounted, and regardless of whether the intended navigation is land-based, water-based, or otherwise.

It is to be understood, therefore, that within the scope of the appended claims, the invention may be practiced otherwise than as specifically set forth herein.

We claim:
1. An electronic navigation device comprising:
a housing assembly, means for selecting a first predetermined angle of said housing assembly relative to the Earth's magnetic field; and
an electronic assembly disposed within said housing assembly for indicating when said housing assembly is oriented at said first predetermined angle, said electronic assembly further comprising a first direction indicator coupled to a power source via a control circuit, said first direction indicator being selectively energized at the beginning of an angular bandwidth corresponding with said predetermined angle by rotation of the electronic navigation device in a first azimuthal direction and remaining selectively energized over said angular bandwidth by continued rotation of the electronic navigation device in said first azimuthal direction beyond said first predetermined angle.

2. The electronic navigation device according to claim 1 further comprising a sensor means for generating an electric current related to the orientation of said housing assembly relative to Earth's magnetic field, said control circuit being connected to said sensor means and activated thereby upon sensing a predetermined level of said electrical current to energize said first direction indicator, thereby indicating when said housing assembly is oriented at said predetermined angle relative to said Earth's magnetic field.

3. The electronic navigation device according to claim 1 further comprising:

a magnetic assembly rotatably mounted in said housing assembly for maintaining alignment with said reference magnetic field; and whereby said control circuit is activated by said magnetic assembly for energizing said first direction indicator to thereby indicate when said housing assembly is oriented at said first predetermined angle relative to said reference magnetic field.

4. The electronic navigation device according to claim 3 wherein said magnetic assembly is provided with an integral compass needle located beneath a transparent section of said housing assembly and viewable therethrough.

5. The electronic navigation device according to claim 4 wherein said housing assembly is provided with directional indicia to allow a visual determination of a directional orientation of said housing assembly relative to said magnetic assembly.

6. The electronic navigation device according to claim 5 wherein said first direction indicator emits light to assist viewing of said housing assembly directional indicia.

7. The electronic navigation device according to claim 3 wherein said control circuit further comprises a Hall effect sensor for sensing an angular position of said magnetic assembly.

8. An electronic navigation device according to claim 7 wherein said electronic assembly further comprises a second direction indicator coupled to said power source via said control circuit, and said control circuit further comprises a second Hall effect sensor for sensing a second predetermined angular position of said magnetic assembly and thereupon energizing said second direction indicator when said housing assembly attains said second predetermined angular position.

9. An electronic device according to claim 8 wherein said first and second predetermined angular positions are approximately 180° apart.

10. The electronic navigation device according to claim 7 wherein said magnetic assembly further comprises a polarized magnet having a north pole and a south pole, and said sensor switch further comprises a Hall effect sensor switch for sensing a proximity of one of said poles of said magnet and thereupon activating said first direction indicator.

11. The electronic navigation device according to claim 7 wherein said Hall effect sensor is activated by electromagnetic energy, and rotational movement of said magnet assembly modulates the electromagnetic energy impinging upon said Hall effect sensor to thereby control energization of said first direction indicator.

12. The electronic navigation device according to claim 1 or 3 wherein said first predetermined angle may be adjusted.

13. The electronic navigation device according to claim 1 wherein said first direction indicator further comprises a visual indicator.

14. The electronic navigation device according to any one of claims 1, 2, or 3 wherein said direction indicator further comprises a visual indicator discernable without focussing the eye.

15. The electronic navigation device according to any one of claims 1, 2, or 3 wherein said first direction indicator further comprises a light emitting diode (LED).

16. The electronic navigation device according to any one of claims 1, 2, or 3 further comprising a support assembly for mounting said housing assembly on a mobile object.

17. The electronic navigation device according to claim 16 wherein said support assembly is mounted on an underwater diving mask.

18. The electronic navigation device according to claim 16 wherein said support assembly embraces said housing assembly and permits rotation of said housing assembly about a first axis.

19. The electronic navigation device according to claim 18 wherein said support assembly is mounted proximate a side window of an underwater diving mask to position said navigation device within a peripheral field of view of a diver.

20. An electronic navigation device comprising:
a housing assembly;
means on the housing assembly for selecting a predetermined angle of said housing assembly relative to the Earth's magnetic field;
a magnet assembly having a magnet with a first pole and a second pole rotatably mounted in said housing assembly for maintaining an alignment with Earth's magnetic field;
an electronic assembly activated by said magnet for indicating when said housing assembly is oriented at said predetermined angle relative to said Earth's magnetic field, said electronic assembly further comprising,
a first direction indicator coupled to a power supply and selectively activated by said magnet to provide a first direction signal,
a first Hall effect sensing element for sensing a proximate presence of said first pole of said magnet, and
a first switch element coupled to said first Hall effect sensing element for energizing said first direction indicator with said power supply as said first pole approaches said first sensing element to signal said housing assembly being rotated in a first azimuthal direction and attaining said first predetermined angle corresponding to the beginning of an angular bandwidth and said switch remaining energized over said angular bandwidth upon continued rotation of said housing assembly in said first azimuthal direction.

21. The electronic navigation device according to claim 20 wherein said first direction indicator further comprises a visual indicator discernable without focussing the eye.

22. The electronic navigation device according to claim 21 wherein said first direction indicator further comprises a light emitting diode (LED).

23. The electronic navigation device according to claim 20 wherein said electronic assembly further comprises:
- a second indicator coupled to the said power supply and selectively activated thereby to provide a second direction signal; and
- said first Hall effect sensing element additionally sensing the presence of the remaining pole of said magnet thereby energizing said second indicator with said power supply to signal that said housing assembly has attained a second predetermined angle relative to the Earth's magnetic field.

24. The electronic navigation device according to any one of claims 20, 33, or 23 further comprising a support assembly for mounting said housing assembly on a mobile object.

25. The electronic navigation device according to claim 24 wherein said support assembly embraces said housing assembly and permits rotation of said housing assembly about a first axis.

26. The electronic navigation device according to claim 24 wherein said support assembly is mounted on an underwater diving mask.

27. The electronic navigation device according to claim 26 wherein said support assembly is mounted proximate a side window of said underwater diving mask to position said navigation device within a peripheral field of view of a diver.

28. The electronic navigation device according to claim 20 wherein said magnet assembly further comprises an annular magnet, a disk attached to said magnet and having a compass needle displayed on a top surface thereof, and a central axle extending through said disk and magnet and rotationally mounted in said housing assembly for allowing self-alignment of said magnet with the Earth's magnetic field.

29. The electronic navigation device according to claim 28 wherein said magnet is a rare earth magnet.

30. The electronic navigation device according to claim 20 wherein said magnet assembly is carried beneath a transparent section of said housing assembly to allow external viewing of the rotational orientation of said magnet.

31. The electronic navigation device according to claim 30 wherein said housing assembly is provided with directional indicia to show a directional orientation of said housing assembly relative to said magnet assembly.

32. The electronic navigation device according to claim 30 wherein said first direction indicator further comprises a light to facilitate viewing of said directional indicia.

33. An electronic navigation device comprising:
- a housing assembly;
- a magnet assembly having a magnet with north and south poles and rotatably mounted in said housing assembly for maintaining an alignment with Earth's magnetic field;
- an electronic assembly activated by said magnet for indicating when said housing assembly is oriented at a predetermined angle relative to said Earth's magnetic field, said electronic assembly further comprising,
  - a first direction indicator coupled to a and selectively activated by said magnet assembly to first direction signal,
  - a first Hall effect sensing element for sensing a proximate presence of one of said poles of said magnet assembly, and
  - a first switch element effect sensing element for energizing said first direction indicator with said power supply upon said sensed said pole, thereby energizing said first direction indicator to signal that said housing assembly has attained a first predetermined angle relative to said Earth's magnetic field, wherein said magnet assembly further comprises:
    - a second direction indicator coupled to said power supply and selectively activated by said magnet assembly to provide a second direction signal;
    - a second Hall effect sensing element for sensing a proximate presence of the other of said poles of said magnet assembly; and
    - a second switch element coupled to said second Hall effect sensing element for energizing said second direction indicator with said power supply upon said sensed presence of said other pole, thereby energizing said second direction indicator to signal that said housing assembly has attained a second predetermined angle relative to said Earth's magnetic field.

34. The electronic navigation device according to claim 33 wherein said first direction indicator and second direction indicator are respective diodes of a bi-color LED, and said first switch element energizes one diode of said LED, and said second switch element energizes another diode of said LED.

35. The electronic navigation device according to claim 33 wherein said first and said second Hall effect sensing elements are integrally contained with the electronic assembly, and said first and said second Hall effect sensing elements respectively sense different poles of said magnet.

36. An electronic navigation device comprising:
- a housing assembly;
- a magnet assembly having a magnet with north and south poles and rotatably mounted in said housing assembly for maintaining an alignment with Earth's magnetic field;
- an electronic assembly activated by said magnet for indicating when said housing assembly is oriented at a predetermined angle relative to said Earth's magnetic field, said electronic assembly further comprising,
  - a first direction indicator coupled to a power supply and selectively activated by said magnet assembly to provide a first direction signal,
  - a first Hall effect sensing element for sensing a proximate presence of one of said poles of said magnet assembly, and
  - a first switch element coupled to said first Hall effect sensing element for energizing said first direction indicator with said power supply upon said sensed presence of said pole, thereby energizing said first direction indicator to signal that said housing assembly has attained a first predetermined angle relative to said Earth's magnetic field,
- wherein said power supply comprises a battery enclosed within said housing assembly, and said electronic assembly further comprises
  - a disk circuit board assembly which includes;

said first direction indicator mounted on one side of said circuit board and selectively connectable to said battery for providing a first direction signal;

said first Hall effect sensing element on side of said circuit board for sensing alignment with a first pole of said magnet; and said switch element for connecting said battery to said first direction indicator upon said first Hall effect sensing element sensing said alignment, thereby activating said first direction indicator to signal that said housing assembly has attained said first predetermined angle relative to the Earth's magnetic field.

37. The electronic navigation device according to claim 36 wherein said enclosed housing assembly includes a transparent cap at one end to allow viewing of said compass needle of said magnetic assembly.

* * * * *